United States Patent [19]

Patterson et al.

[11] Patent Number: 4,859,511

[45] Date of Patent: Aug. 22, 1989

[54] UNDERCOATED SILICONE RELEASE SHEET

[75] Inventors: Robert Patterson, Neenah; Stephen M. Papez, Oshkosh, both of Wis.

[73] Assignee: James River Corporation of Virginia, Norwalk, Conn.

[21] Appl. No.: 231,270

[22] Filed: Aug. 12, 1988

Related U.S. Application Data

[63] Continuation-in-part of Ser. No. 67,830, Jun. 30, 1987, abandoned.

[51] Int. Cl.$^4$ .................... B32B 7/02; B32B 25/06; B32B 27/16
[52] U.S. Cl. .................... 428/40; 428/212; 428/447; 428/449; 428/451; 428/452; 428/512; 428/514; 428/521
[58] Field of Search ............... 428/447, 448, 449, 451, 428/40, 212, 537.5, 452, 512, 514, 521

[56] References Cited

U.S. PATENT DOCUMENTS

| | | | |
|---|---|---|---|
| 3,752,732 | 8/1973 | Peterson | 428/449 |
| 4,288,497 | 9/1981 | Tanaka et al. | 428/447 |
| 4,609,589 | 9/1986 | Hosoda et al. | 428/458 X |
| 4,614,677 | 9/1986 | Pennance | 428/447 |

*Primary Examiner*—Ellis P. Robinson
*Assistant Examiner*—Amy Hulina
*Attorney, Agent, or Firm*—Richard J. Gallagher

[57] ABSTRACT

Release sheets formed on paper, nonwoven fabric, polymeric film, or extrusion-coated paper substrates are disclosed. The release sheets have a low polar surface energy hydrocarbon undercoating of low elastic modulus interposed between the substrate and a silicone release coating.

9 Claims, No Drawings

UNDERCOATED SILICONE RELEASE SHEET

This Application is a Continuation-in-part of serial number 07/067,830, filed 06/30/87, now abandoned.

FIELD OF THE INVENTION

The present invention relates to release sheets. Release sheets are temporary members used to facilitate the handling of adhesive-coated and other tacky articles.

Various types of release sheets are used with adhesive products such as adhesive tapes, bumper stickers, labels, sealants, caulks, mastics, medical devices, solar screen films, rubber separator sheets, etc. The release coating on the release sheet should adhere sufficiently to the support substrate to prevent transfer of the release coating to the adhesive with resultant detackification of the adhesive. The basic construction of the release sheet used for such purposes consists of a support substrate having a release layer formed on at least one side thereof. A undercoating holdout layer may be interposed between the support substrate and the release layer.

DESCRIPTION OF THE RELATED ART

Release sheets have been made using a wide variety of substrates, including cellulosic materials such as paper and paperboard, polymeric films, and cellulosic materials coated with polymeric films. Release coatings, too, form a diverse categorization—fluorocarbons, chrome complexes, fatty acid amides, long chain hydrocarbon-containing polymers, and various silicone polymers have been found to be useful in the manufacture of release coatings. Undercoats, however, have not been so widely investigated. Among the undercoating layers in use today are those formed by polyethylene extrudates, by clay-based pigments used in conjunction with water-soluble polymers such as poly(vinyl alcohol), and by starch size press coatings thickened with kelgin (sodium alginate), carboxymethylcellulose, or polyvinyl alcohol. These under coats are intended to provide "hold out" for the silicone coating and to enhance the smoothness of the base sheet.

U.S. Patent No. 4,609,589 is directed to release sheet undercoatings based upon mixtures of certain acrylic resin emulsion compositions. In their Comparative Examples 41–49, the patentees disclose release sheets comprising aluminum foil/paper substrates in which the silicone release layer is undercoated with polyethylene or a 100:20 mixture of clay with SBR latex. This disclosure is in the context of demonstrating that hydrophobic hydrocarbon-type undercoatings are inferior to hydrophilic coatings.

SUMMARY OF THE INVENTION

It is one object of this invention to reduce the total amount of silicone necessary to manufacture high quality release sheets.

It is another objective of this invention to provide high performance, high quality release liners with the desired release level at the lowest possible silicone coating weight.

It is a further object of this invention to provide release sheets with enhanced aged-release characteristics.

It is a still further objective of this invention to prevent adhesive "lock up" when self-crosslinking acrylic adhesives are used.

These and other ends can be achieved by practicing the present invention, which relates to a release sheet that comprises a support substrate having a release layer formed on at least one side thereof with an undercoating layer interposed between the support substrate and the release layer. The undercoating layer according to the present invention consists essentially of hydrocarbon materials characterized by low polar surface energy and by low modulus of elasticity. Said undercoating layer generally also shows low tensile strength and low glass transition temperature ("Tg").

DESCRIPTION OF THE PREFERRED EMBODIMENTS

Examples of the support substrate in the release sheet according to the present invention include cellulosic and/or polymeric materials such as paper bases, nonwoven fabrics, polymeric films, and extrusion-coated papers.

Suitable paper bases are made of bleached, semi-bleached, and natural kraft paper, supercalendered kraft paper, parchment, glassine, machine-finished paper, machine-glazed paper, fine paper, and paperboard having basis weights of 18–400 g/m$^2$ and thicknesses of 30–500 microns.

Suitable nonwoven fabrics have basis weights of 10–150 g/m$^2$ and thicknesses of 30–400 microns and are produced by the dry method, wet method, or direct method.

Suitable polymeric films have thicknesses on the range of 10 to 800 microns. Illustrative examples include films of polyolefins such as polyethylene, polyproplyene, and polybutylene. Polyester films such as polyethylene terephthalate films, polyvinyl chloride films, polyvinylidene chloride films, polyvinylidene fluoride films, polysulfone films, polyimide films, and films of various nylon polymers may also be used as substrates, as may be high impact polystyrene films. Also, coextruded films consisting of two or more layers of one or more of the polymers mentioned may be used.

Paper extrusion-coated with polyolefins including low density polyethylene, high density polyethylene, linear low density polyethylene, polypropylene, and the like also provide a usable base for precoating.

The release agent used in the present invention is not limited to any particular type. Known release agents based upon silicone polymers are currently preferred. The disclosed technology works well with thermal addition and condensation cure solvent or solventless silicone systems catalyzed by tin, platinum, rhodium, or other suitable catalysts and with electron beam or other radiation cure silicones.

The deposition of the release coating may be effected by conventional methods. It may be applied, for instance neat or from a solvent, using such techniques as offset gravure, direct gravure, or multiple roll. Depending upon the end use, the release layer and undercoating system may be applied to one or to both sides of the substrate. When both sides of the substrate are coated, different systems may be used on each side in order to provide a differential release liner.

Materials that can be used to make good undercoatings according to the present invention are hydrophobic in nature and are those characterized by low tensile strength, by low glass transition temperature, and by low modulus of elasticity. In particular, their hydrophobicity will be such that the polar component of surface energy for such materials will be less than 4 dynes per centimeter. Their elastic modulus will be less than 3000 pounds per square inch. Materials will generally be selected such that their glass transition temperature will be below the end use temperature of the release system. Examples of materials that may be used include polybutadiene, polyisoprene, $C_{14}$–$C_{16}$ alkyl ketene dimers, alkenyl succinic anhydride, block copolymers such as styrene-butadiene-styrene, styrene-isoprene-styrene, styrene-ethylene-butylene-styrene, styrene-ethylene-propylene, and the like, polybutadiene diacrylate, and blends of polybutadiene diacrylate with $C_{14}$–$C_{15}$ diacrylates. Other hydrocarbons and hydrocarbon-like materials with similiar physical and chemical properties may also be used. The structure of these precoat materials must include a substantial continuous aliphatic component, since aromaticity increases modulus and surface energy. For example, random styrene butadiene copolymers as found in styrene butadiene rubbers perform poorly while block copolyers made from the same monomers perform much better. In general it must be noted, though, that any dilution of the polybutadiene or rubber component of the system will reduce release performance.

The precoats can be applied neat or from a solvent using conventional techniques such as direct gravure, offset gravure, or multiple roll coating.

Depending upon the end use, the precoat can be applied to one or both sides of the substrate. When both sides of the substrate are release-coated, differential release can be obtained in a variety of ways. That is, the same precoat could be used on both sides while different release coatings are applied to each side. Conversely, two different precoats according to the present invention could be used on opposite sides of the substrate, both precoats being coated with the same release system. Finally, both different precoats and different release coatings systems could be employed.

The release sheets of the present invention are normally used to mask adhesive zones of adhesive-coated articles by being themselves adhered to said zones. They are generally removed from the articles just prior to use, exposing the still tacky adhesive zone.

EXAMPLES

Substrates were precoated with hydrocarbon or hydrocarbon-like materials according to the present invention or with other materials for comparison or were left un-undercoated as controls. Silicone release coatings were applied to the precoated substrates, using a 360 Q Pamarco offset proofer, at levels of 25%, 50%, and 75% solids so that a range of coating weights could be achieved. The coatings were then dried or cured depending on their chemistry. The siliconized bases were tested according to TAPPI um-502, with two modifications. First, Zonas adhesive tape (from Johnson & Johnson) was substituted for J & J Red Cross tape and applied to cover the silicone release coatings. Second, the taped samples were aged at 70° C. and ¼ psig for various periods of time up to 28 days instead of for 24 hours. The tapes were then stripped from the release liner at a rate of 12 inches per minute using an Instron. The force required to remove the tape, in grams per inch of width, is reported in the tables that follow.

In the examples that follow, the materials shown below were used. The modulus numbers have been reported in pounds per square inch ("psi") and were measured on two-inch long specimens at an initial strain rate of 50% per minute on an Instron tensile properties analyzer. The polar surface energy was determined from contact angle measurements and the Owens/Wendt/Young equation. It is reported in dynes per centimeter.

| DESIGNATION: | DESCRIPTION: |
|---|---|
| Substrates | |
| Plainwell | Supercalendered kraft paper |
| J. Mass SCK | Supercalendered kraft paper |
| J. Mass SLF | Supercalendered kraft paper |
| PD-192 | Double-coated supercalendered kraft paper |
| Undercoats | |
| SBS | Styrene-butadiene-styrene<br>MODULUS = 2412; polar surface energy = 1.8 |
| C5000:C000 | Blend of polybutadiene diacrylate with $C_{14}$–$C_{15}$ diacrylates (2:1 blend)<br>MODULUS = 479; polar surface energy = 1.1 |
| C5000 | Polybutadiene diacrylate<br>MODULUS = 270 (calculated);<br>polar surface energy = 1.1 |
| NRL | Natural rubber latex (polyisoprene)<br>MODULUS = 133; polar surface energy = 4.3 |
| PBD | Polybutadiene<br>MODULUS = 57; polar surface energy = 1.3 |
| LDPE | Low density polyethylene<br>MODULUS = 15,100; polar surface energy = 2.4 |
| PVAC | Polyvinylacetate<br>MODULUS = 256,000;<br>polar surface energy = 9.5 |
| UA | Acrylated polyurethane<br>MODULUS = 142,400;<br>polar surface energy = 9.1 |
| Release Coats | |
| RC450 | Electron-beam-radiation curable silicone acrylate |
| 7610/7611 | Platinum-catalyzed-addition curable silicone |

TABLE I

Substrate: Plainwell
Release Coat: RC450

| Undercoat | Silicone level | Days 1 | 7 | 14 | 21 | 28 |
|---|---|---|---|---|---|---|
| Polyvinyl-acetate | 25% | 201 | 236 | 240 | 292 | 337 |
| | 50% | 106 | 214 | 229 | 199 | 278 |
| | 75% | 54 | 105 | 136 | 140 | 151 |
| Acrylated-polyurethane | 25% | 42 | 96 | 132 | 145 | 169 |
| | 50% | 23 | 64 | 72 | 113 | 128 |
| | 75% | 20 | 43 | 60 | 79 | 89 |
| C5000:C2000 | 25% | 13 | 20 | 19 | 24 | 33 |
| | 50% | 11 | 17 | 15 | 23 | 24 |
| | 75% | 11 | 16 | 17 | 22 | 23 |

Readhesion of the adhesive was greater than 100% in all cases.

TABLE II

Substrate: J. Mass SLF
Release Coat: RC450

| Undercoat | Silicone level | Days 1 | 7 | 14 | 21 | 28 |
|---|---|---|---|---|---|---|
| Uncoated | 25% | 109 | 193 | 177 | 212 | 224 |
| | 50% | 42 | 61 | 108 | 133 | 126 |
| | 75% | 17 | 25 | 45 | 54 | 64 |
| C5000:C2000 | 25% | 16 | 24 | 21 | 29 | 35 |
| | 50% | 14 | 20 | 24 | 30 | 36 |
| | 75% | 12 | 16 | 21 | 21 | 23 |

Readhesion of the adhesive was greater than 100% in all cases.

TABLE III

Substrate: PD-192
Release Coat: RC450

| Undercoat | Silicone level | \multicolumn{5}{c}{Days} |
|---|---|---|---|---|---|---|
| | | 1 | 7 | 14 | 21 | 28 |
| Uncoated | 25% | 104 | 197 | 244 | 247 | 305 |
| | 50% | 39 | 87 | 119 | 151 | 182 |
| | 75% | 21 | 34 | 52 | 64 | 75 |
| C5000:C2000 | 25% | 14 | 23 | 26 | 31 | 39 |
| | 50% | 13 | 18 | 22 | 26 | 26 |
| | 75% | 12 | 12 | 21 | 20 | 25 |

Readhesion of the adhesive was greater than 100% in all cases.

TABLE IV

Substrate: Plainwell
Release Coat: 7610/7611

| Undercoat | Silicone level | \multicolumn{5}{c}{Days} |
|---|---|---|---|---|---|---|
| | | 1 | 7 | 14 | 21 | 28 |
| Uncoated | 25% | 77 | 65 | 67 | 45 | 72 |
| | 50% | 24 | 44 | 36 | 37 | 39 |
| | 75% | 20 | 18 | 19 | 20 | 17 |
| C5000:C2000 | 25% | 9 | 20 | 22 | 28 | 21 |
| | 50% | 7 | 11 | 15 | 12 | 18 |
| | 75% | 4 | 9 | 10 | 10 | 11 |

Readhesion of the adhesive was greater than 100% in all cases.

Similar tests were run on non-undercoated samples and on samples precoated with various hydrocarbon and hydrocarbon-type materials at the following silicone coating weights (in pounds per ream): PBD, 0.47; SBS, 0.52; C5000, 0.34; NRL, 0.51; and low density polyethylene ("LDPE"), 0.45. The results confirmed that undercoating layers made of materials having low polar surface energy and low modulus of elasticity provide release sheets with enhanced aged-release characteristics. These examples illustrate that low polar surface energy is more critical to release than low modulus. Regression data indicates that release follows a power law function ($y = kx^n$) where y=release force and x=polar surface energy times the natural logarithm of elastic modulus.

TABLE V

Substrate: J. Mass SLF
Release Coat: RC450

| Undercoat: | \multicolumn{5}{c}{Days} |
|---|---|---|---|---|---|
| | 1 | 7 | 14 | 21 | 28 |
| Uncoated | 74 | 166 | 220 | 244 | 254 |
| PBD | 6 | 15 | 28 | 37 | 50 |
| SBS | 11 | 22 | 49 | 74 | 65 |
| C5000 | 4 | 10 | 11 | 15 | 16 |
| NRL | 9 | 22 | 44 | 58 | 79 |
| LDPE | 24 | 48 | 50 | 62 | 89 |

Readhesion of the adhesive was greater than 100% in all cases.

It is well known that electron beam-curable silicone acrylate release coatings perform poorly with self-crosslinking acrylic adhesive systems. The acrylic adhesives react with residual acrylate groups in the silicone coating. This chemical bonding of the adhesive and release coating has prevented penetration of radiation cure silicones into many markets. Precoats according to the present invention significantly reduce adhesive lock up as shown in Table VI. In this example, Monsanto Gelva® GMS-263 self-crosslinking acrylic adhesive was used instead of Zonas tape. Otherwise aging and testing conditions were maintained as in the previous examples.

TABLE VI (Test Adhesive = GMS-263)
Substrate: J. Mass SCK
Release Coat: RC450

| Undercoat | Silicone level | \multicolumn{5}{c}{Days} |
|---|---|---|---|---|---|---|
| | | 1 | 7 | 14 | 21 | 28 |
| Uncoated | 25% | 47 | 142 | (T) | (T) | (T) |
| | 50% | 25 | (T) | (T) | (T) | (T) |
| | 80% | (T) | (T) | (T) | (T) | (T) |
| C5000:C2000 | 25% | 10 | 23 | 24 | 33 | 67 |
| | 50% | 9 | 21 | 26 | 28 | 53 |
| | 80% | 8 | 25 | 35 | 29 | 47 |

(T) indicates that the sample tore - "release" was unsatisfactory.

The present disclosure is intended to be illustrative rather than restrictive. The scope of the invention patented is to be limited only by the express language of the following claims.

We claim:

1. A release sheet comprising (a) a substrate layer selected from the group consisting of paper, nonwoven fabric, polymeric film, and extrusion-coated paper, (b) an undercoating layer that has a polar component of surface energy of less than 4 dynes per centimeter and a modulus of elasticity of less than 3000 psi bonded to said substrate layer and selected from the group consisting of polybutadiene, polyisoprene, $C_{14}$–$C_{16}$ alkyl ketene dimers, alkenyl succinic anhydride, block copolymers of styrene-butadiene-styrene, styrene-isoprene-styrene, styrene-ethylene-butylene-styrene, and styrene-ethylene-propylene, polybutadiene diacrylate, and blends of polybutadiene diacrylate with $C_{14}$–$C_{15}$ diacrylates, and (c) a silicone release layer bonded to said undercoating layer.

2. A release sheet according to claim 1 wherein said undercoating layer selected from the group consisting of polybutadiene, polyisoprene, styrene-butadiene-styrene, styrene-isoprene-styrene, styrene-ethylene-butylene-styrene, styrene-ethylene-propylene, or polybutadiene diacrylate.

3. A release sheet according to claim 2 wherein said substrate layer is paper or extrusion-coated paper, said undercoating layer is polybutadiene, polyisoprene, styrene-butadiene-styrene block copolymer, or is polybutadiene diacrylate optionally blended with $C_{14}$–$C_{15}$ diacrylates, and said release layer is a radiation-cured silicone or a thermally-cured silicone.

4. A release sheet according to claim 3 wherein said substrate layer is supercalendered kraft paper, said undercoating layer is polybutadiene, and said release layer is an electron beam radiation-cured silicone.

5. A release sheet according to claim 3 wherein said substrate layer is supercalendered kraft paper, said undercoating layer is polybutadiene, and said release layer is an addition-cured silicone.

6. A release sheet according to claim 1 wherein said undercoating layer has a polar surface energy of less than 2 dynes per centimeter and a modulus of elasticity of less than 500 psi.

7. A release sheet according to claim 1 wherein one side only of said substrate layer has bonded thereto said undercoating layer and said release layer.

8. A release sheet according to claim 1 wherein one side of said substrate layer has bonded thereto an undercoating layer and a release layer as defined in claim 1 and the other side of said substrate layer has bonded thereto a different release layer system.

9. A release sheet according to claim 8 wherein both said first side and said second side of said substrate layer have bonded thereto undercoating layers as defined in claim 1, provided that each of said undercoating layers as defined in claim 1 differs from the other in polar component of surface energy and/or in modulus of elasticity and provided that both said release layers are the same as one another, resulting in a release sheet characterized by differential release.

* * * * *